3,763,162
TRANSESTERIFICATION OF QUINOXALINE-
2-CARBOXYLIC ACID ESTERS
Robert V. Kasubick, Gales Ferry, Conn., assignor to
Pfizer Inc., New York, N.Y.
No Drawing. Filed Aug. 6, 1971, Ser. No. 169,844
Int. Cl. C07d 51/78
U.S. Cl. 260—250 Q          7 Claims

ABSTRACT OF THE DISCLOSURE

Synthesis of 2-hydroxyethyl esters of 2-quinoxalinecarboxylic acid-1,4-dioxides through the transesterification of the lower alkyl esters with ethylene glycol in the presence of oxygen and a catalytic amount of calcium hydroxide or barium hydroxide at a temperature of 30–50° C.

BACKGROUND OF THE INVENTION

This invention relates to a process for the preparation of 2-hydroxyethyl esters of 2-quinoxalinecarboxylic acid-1,4-dioxides which comprises transesterification of lower alkyl esters of 2-quinoxalinecarboxylic acid-1,4-dioxides with ethylene glycol in the presence of the base catalyst, i.e., calcium hydroxide or barium hydroxide. The products of said process are extremely useful as antibacterial agents and as intermediates leading to compounds having activity against pathogenic microorganisms.

Transesterification reactions employing ethylene glycol and an appropriate ester have been disclosed in the art. Sumoto, Kogyo Kagaku Zasshi, 66, 1867 (1963); C.A., 61, 3198f (1964), for example, studied the effects of various catalysts, including metallic sodium, potassium carbonate, and p-toluenesulfonic acid on the transesterification of dimethyl phthalate, terephthalate and isophthalate with ethylene glycol. A similar study, employing dimethyl phthalate, ethylene glycol and catalyst comprising the oxides and carbonates of lead, cadmium, zinc, magnesium, mercury and cerium was carried out by Torraca et al., Chim. Ind., 44, 483 (1962); C.A., 57, 5848i (1962). In both reported studies the use of calcium or barium hydroxides is not disclosed.

Efforts to synthesize clear resins employing dimethyl terephthalate, ethylene glycol and metal alkyls comprising diethylcadmium, -zinc, -aluminum, -antimony and -boron are reported by Niyaka, Kogyo Kagaku Zasshi, 64, 744 (1961); C.A., 57, 4338 (1962). A similar effort, using dimethyl terephthalate, ethylene glycol and zinc acetate, is claimed in U.S. Pat. 2,998,412.

SUMMARY OF THE INVENTION

It has now been discovered that quinoxaline-di-N-oxides of the formula:

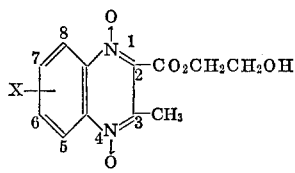

are prepared in excellent yield by a process which comprises contacting a compound of the formula:

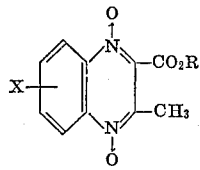

wherein X is a substituent at the 6- or 7-position selected from the group consisting of hydrogen, chlorine, bromine, trifluoromethyl, methyl and methoxy and R is alkyl containing from 1 to 4 carbon atoms, with ethylene glycol in the presence of oxygen and a catalytic amount of a base selected from the group consisting of barium hydroxide and calcium hydroxide, at a temperature of 30–50° C.

In like manner, this process invention is applicable in transesterification reactions wherein lower alkyl esters of 2-quinoxalinecarboxylic acid - 1,4-dioxides are contacted with alkanol of the formula:

HO—A—Z wherein A is alkylene of from 3 to 5 carbon atoms and Z is hydroxy and wherein A is alkylene of from 2 to 5 carbon atoms and Z is acyloxy of the formula —$O_2CR_1$ wherein $R_1$ is selected from the group consisting of hydrogen, alkyl containing from 1 to 4 carbon atoms, alkylamino containing from 1 to 4 carbon atoms, alkoxy containing from 1 to 4 carbon atoms, carboxyalkyl containing from 2 to 9 carbon atoms, phenyl and substituted alkyl wherein said alkyl contains from 1 to 3 carbon atoms and said substituent is selected from the group consisting of chlorine, bromine and dialkylamino wherein said alkyl contains from 1 to 3 carbon atoms.

Of particular interest in the process of the present invention is the calcium hydroxide or barium hydroxide catalyzed reaction of 3-methyl-2-quinoxalinecarboxylic acid, methyl ester, 1,4-dioxide with ethylene glycol.

DETAILED DESCRIPTION OF THE INVENTION

The aforedescribed reaction is depicted in the following scheme:

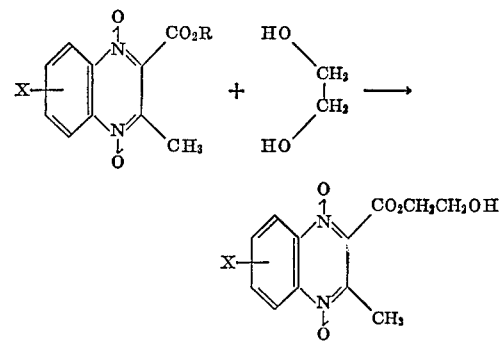

wherein X and R are as previously indicated.

In the above described reaction for the transesterification of lower alkyl esters of 3-methyl-2-quinoxalinecarboxylic acid-1,4-dioxides with ethyleneglycol, the theoretical ratio of reactants is 1:1. In practice, however, the reaction is forced to completion by the employment of an excess of the less costly reactant, ethyelne glycol. Excesses, on a weight basis, of 300% provide excellent yields of high quality product.

The preferred manner in which the present process is carried out employs the reagent ethylene glycol as the solvent, although in some instances it may be desirable to conduct said reaction in a reaction inert solvent. By such solvents is contemplated those which, under the conditions of the instant process, do not enter into appreciable reaction with either the starting reactants or products. It is preferred that non-aqueous, aprotic solvents be employed, although a small amount of moisture, to the extent of 0.05–1.4%, is tolerable without markedly affecting the yields or purity of the resulting product. Suitable solvents or combinations thereof which are included in this group are chlorinated(lower)alkyl hydrocarbons, (lower)alkylnitriles, N,N-di(lower)alkyl-(lower)alkylcarboxamides and liquid aromatic hydrocarbons.

Reaction time is not critical and is inherently dependent on concentration, percent of water present, reaction temperature and reactivity of the starting reagents. In general, when temperatures of 30–50° C. are employed, the reaction time will vary from 2–18 hours. Increasing the reaction temperature above 50° C. offers no advantage and can be detrimental in terms of lower yields and poorer quality of the desired product.

The order in which the reactants are combined does not affect the outcome of the reaction. Experimentally, the appropriate lower alkyl ester of 3-methyl-2-quinoxalinecarboxylic acid-1,4-dioxide and the ethylene glycol are combined in a suitable reaction vessel, heated to 30–50° C. and the catalyst, calcium or barium hydroxide, added.

In the present process invention a wide variety of basic reagents were employed before it was determined that the transesterification of alkyl esters of 2-quinoxalinecarboxylic acid-1,4-dioxides with ethylene glycol using calcium or barium hydroxide provided excellent yields of high quality product. Further, it has been found that catalytic amounts of said reagent give better yields than when large amounts are employed, the preferred range of calcium hydroxide or barium hydroxide being from 2.5–4.0 mole percent.

As one skilled in the art can readily appreciate, several pro-forms of calcium and barium hydroxides are contemplated and under the proper experimental conditions can be employed with similar success. Such pro-forms of calcium and barium hydroxides are calcium and barium reagents, which on contact with the requisite amount of water are converted into calcium and barium hydroxides. These include their hydrides, oxides and (lower)alkoxides.

Also considered within the scope of the present process invention are processes wherein varying combinations of the aforementioned bases and pro-forms thereof are employed as the catalyst.

Isolation of the products from the herein described process is conveniently carried out by procedures familiar to those skilled in the art. For example, when ethylene glycol is employed as the reagent and solvent, the reaction mixture is cooled, diluted with water and the product extracted with a water immiscible solvent such as methylene chloride. In those instances wherein a solvent is employed, said solvent being water miscible, the reaction is quenched in water and the product is extracted as previously mentioned. When a water immiscible solvent is employed the reaction mixture is quenched with water and the product extracted in the reaction solvent. The solvent containing the product is removed under reduced pressure and the residual product recrystallized from a suitable solvent.

It has been unexpectedly found that the atmosphere to which the aforedescribed reaction is exposed is extremely critical to the formation of the desired products. When said reaction is conducted in an atmosphere and medium devoid of oxygen no detectable product could be found. Such oxygen free atmosphere included nitrogen, carbon dioxide, argon and helium. If oxygen is introduced either into the atmosphere above the surface of said reaction mixture or allowed to bubble through said reaction mixture, the transesterification proceeds in a normal manner and the desired reaction product is obtained. It is preferred, of course, to conduct said process to completion in the presence of air which is comprised of approximately 80% nitrogen and 20% oxygen.

The requisite lower alkyl esters of 3-methyl-2-quinoxalinecarboxylic acid-1,4-dioxides employed as starting reagents for the present process invention are easily prepared from the corresponding lower alkyl acetoacetate and an appropriately substituted benzofuroxan according to the method as taught by Haddadin et al., J. Org. Chem., 31, 4067 (1966). The synthesis of benzofuroxans and methods for their preparation is reviewed by Kaufman et al., in Advan. Heterocyclic Chem., 10, 1 (1969). The lower alkyl acetoacetates are either commercial reagents or are prepared from diketene and the appropriate alcohol according to the general procedure of Brintzinger et al., Chem. Ber., 83, 103 (1950).

The preferred embodiment of the present invention relates to the use of the basic catalysts, calcium hydroxide or barium hydroxide, and pro-forms thereof, in the transesterification of lower alkyl esters of 3-methyl-2-quinoxalinecarboxylic acid-1,4-dioxides with ethylene glycol wherein X is hydrogen and R is methyl.

As previously mentioned, the products of the present process invention wherein X is as previously indicated and R is 2-hydroxyethyl are remarkably effective in treating a wide variety of pathogenic microorganisms. They are, therefore, useful as industrial antimicrobials, for example, in water treatment, slime control, paint and wood preservation as well as for topical application purposes as disinfectants. Products wherein X is as indicated and R is 2-hydroxyethyl, in addition to having useful antimicrobial activity, can be transformed, via acylation, into other useful antibacterials, e.g., acetylation with acetic anhydrides, to yield the congener wherein R is acetoxyethyl, etc.

For in vitro use, e.g., for topical application, it will often be convenient to compound the selected product with a pharmaceutically acceptable carrier such as vegetable or mineral oil or an emollient cream. Similarly, they may be dissolved or dispensed in liquid carriers or solvents such as water, alcohol, glycols or mixtures thereof or other pharmaceutically acceptable inert media, that is, media which have no harmful effect on the active ingredient. For such purposes, it will generally be acceptable to employ concentrations of active ingredients of from about 0.01 percent to about 10 percent by weight based on total composition.

In determining the in vitro activity of the herein described antibiotic, the sensitivity of the various microorganisms is determined by the commonly accepted twofold serial dilution technique. Final concentrations of compound per ml. range from 100 mcg. in the first tube to 0.19 mcg. in the tenth tube. The inoculum consists of 0.5 ml. of a $1 \times 10^{-3}$ dilution of a standardized culture. Final volume in each tube or cup in the Dis Poso tray is 1.0 ml. The tubes are incubated at 37° C. for approximately 24 hours. The medium used is Witkins Synthetic or Brain Heart Infusion (BHI). The sensitivity (MIC—minimal inhibitory concentration) of the test organism is accepted as the least amount of compound capable of producing complete inhibition of growth as evidenced by the absence of gross turbidity.

Further, compounds described herein exhibit broad spectrum activity, that is, activity against both Gram-negative and Gram-positive bacteria, in contrast to the usual Gram-negative activity of quinoxaline-di-N-oxides. Additionally, they are active in vivo.

When use in vivo for such purposes, these novel compounds can be administered orally or parenterally, e.g., by subcutaneous, intramuscular, or intravenous injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with therapeutic efficiency of the preparation and are nontoxic in the volume or proportion used (glycerol, propylene glycol, sorbitol and dimethylacetamide). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically acceptable inert carriers including solid diluents, aqueous vehicles, nontoxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

The in vivo efficacy of the compounds of the instant invention or products derived therefrom is determined by the antibacterial activity against acute infections in mice. The acute experimental infections are produced by the intraperitoneal inoculation of standardized culture suspended in either 5% hog gastric mucin or broth. A brief discussion of the words "standardized culture" would seem to be beneficial. In order to obtain reproducible results with a test compound it is necessary to control, as much as possible, the many variables that can enter into this type of test. An organism of high virulence if used in large enough numbers can make almost any drug look inactive. On the other hand, an inoculum not able to produce a measurable difference between treated and untreated groups is equally lacking in purpose.

Stock cultures of test organisms are normally maintained on slants or in liquid medium. When not routinely used they are maintained at refrigerator temperature or in a lyophilized state. When it becomes necessary to use a culture in animal protection tests the culture is suspended in a volume of saline or broth, and the density of the suspension is measured by a photoelectric colorimeter. From this stock, ten-fold dilutions are prepared. Each dilution is inoculated into a series of mice in order to determine the $LD_{100}$, the $LD_{100}$ being the lowest concentration of organisms required to produce 100 percent deaths. For example, if it is found that a dilution of $10^{-4}$ is the lowest level of organism that will produce 100 percent death, an inoculum of $10^{-3}$ would probably be used for the drug evaluation experiments. This means that we are using about 10 $LD_{100}$ or ten times the minimum dose required to kill mice. Such a test would also include the use of control animals which receive an inoculum of $10^{-4}$, $10^{-5}$ and possibly $10^{-6}$. These dilutions are included as a check on possible variation in virulence which can occur. Having previously determined, through the virulence titration, that $10^{-4}$ was the maximum dilution that will kill we naturally expect these animals to die, usually within 24 hours.

Each organism has its own standardized inoculum level. Some, such as Staphylococcus, may be used at $10^{-1}$, while others like Streptococcus require weekly animal passage in order to maintain virulence.

When evaluating an antibiotic for its effectiveness after a single dose, the dose is usually administered 0.5 hour after inoculating the mice with the lethal concentration of organisms. In this type of treatment schedule surviving mice are usually held for four days after the treatment and the percent alive is calculated.

The addition of a low level of one or more of the herein described 2-quinoxalinecarboxylic acid, alkanoyloxyethyl ester, 1,4-dioxides, prepared from the 2-hydroxyethyl ester products of the present invention, to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

The herein described feed compositions have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency (the number of pounds of feed required to produce a pound gain in weight). Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers to provide pre-mixes or concentrates which may readily be blended with standard nutritionally balanced feeds or which may be used themselves as an adjunct to normal feedings.

In the preparation of concentrates a wide variety of carriers may be employed containing the aforesaid drugs. Suitable carriers include the following: soybean oil meal, cornmeal, limestone and corncob meal. The carrier facilitates uniform distribution of the active materials in the finished feed with which the concentrate is blended. This is especially important because only a small proportion of these potent materials is required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The high potency concentrates may be blended by the feed manufacturer with proteinaceous carriers, such as soybean oil meal, to produce concentrated supplements which are suitable for direct feeding to animals. In such instances, the animals are permitted to consume the usual diet of corn, barley and other fibrous grains and the like. The proportion of the drug in these supplements may vary from about 0.1 to 10 g. per pound of supplement.

The concentrate described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well known to those skilled in the art, the types of diets are extremely variable depending upon the purpose, type of feeding operation, species, etc. Specific diets for various purposes are listed by Morrison in the appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The following examples are provided solely for the purpose of illustration.

EXAMPLE 1

3-methyl-2-quinoxalinecarboxylic acid, 2-hydroxyethyl ester, 1,4-dioxide (A) Calcium hydroxide catalyst.—To a solution of 20 ml. of ethylene glycol (0.05% water) containing 5 g. (21.4 mmoles) of 3-methyl-2-quinoxalinecarboxylic acid, methyl ester, 1,4-dioxide and heated to 40° C. is added 39.6 mg. (0.53 mmole) of calcium hydroxide. The reaction mixture is stirred at 40° C. for 4–5 hours and is then diluted with 30 ml. of water, cooled to 0° C. and the precipitate filtered. The solids are dissolved in chloroform, filtered and the filtrate dried over sodium sulfate. The solvent is removed under reduced pressure to provide the desired product, 4.69 g. (83.2% yield), M.P. 139–141° C.

(B) Barium hydroxide catalyst.—A solution of 20 ml. of ethylene glycol containing 5 g. (21.4 mmoles) of 3-methyl-2-quinoxalinecarboxylic acid, methyl ester, 1,4-dioxide is heated to 35° C. and treated with 167 mg. (0.53 mmole) of barium hydroxide octahydrate. The reaction mixture is cooled, diluted with 30 ml. of water and the solids filtered. The filter cake is dissolved in 60 ml. of chloroform, dried over sodium sulfate and the solvent removed under reduced pressure, 3.88 g. (69% yield), M.P. 120–128° C.

EXAMPLE 2

Starting with the appropriately substituted 3-methyl-2-quinoxaline carboxylic acid, (lower)alkyl ester, 1,4-dioxide, ethylene glycol and calcium or barium hydroxide, and repeating the procedure (A) or (B) of Example 1, respectively, the following compounds are prepared:

TABLE—Continued

| Starting ester | Base | Product |
|---|---|---|
| [3-methyl-6-methoxy-2-quinoxalinecarboxylic acid, isopropyl ester, 1,4-dioxide structure] | Ca(OH)₂ | [3-methyl-6-methoxy-2-quinoxalinecarboxylic acid, 2-hydroxyethyl ester, 1,4-dioxide structure] |
| [3-methyl-6-methoxy-2-quinoxalinecarboxylic acid, methyl ester, 1,4-dioxide structure] | Ca(OH)₂ | [3-methyl-6-methoxy-2-quinoxalinecarboxylic acid, 2-hydroxyethyl ester, 1,4-dioxide structure] |

EXAMPLE 3

Starting with the same relative amounts of 3-methyl-2-quinoxalinecarboxylic acid, methyl ester, 1,4-dioxide, a base and ethylene glycol, the general procedure of Example 1(A) is repeated employing the indicated reaction time and temperature. The indicated bases are employed in the amount of 10 mole percent to the starting ester reagent; the yields of the product, 3-methyl-2-quinoxalinecarboxylic acid, 2-hydroxyethyl ester, 1,4-dioxide, using the noted parameters, show the comparative effectiveness of calcium hydroxide.

| Base employed | Reaction Time, hr. | Temperature, °C. | Yield of product, percent |
|---|---|---|---|
| Ca(OH)₂ | 2 | 40 | 83 |
| DABCO [1] | 18 | 40 | [2] |
| Pyridine | 18 | 40 | [2] |
| Na₂CO₃ | 18 | 40 | 45 |
| NaOH | 3 | 40 | [2] |
| CaH₂ | 3 | 40 | [2] |
| Mg(OH)₂ | 18 | 40 | |

[1] Diazobicyclooctane.
[2] Thin layer chromatography indicated low (20–30%) conversion to the desired product which was not isolated.

EXAMPLE 4

3-methyl-2-quinoxalinecarboxylic acid, 3-hydroxypropyl ester, 1,4-dioxide

A solution of 4.7 g. (0.02 mole) of 3-methyl-2-quinoxalinecarboxylic acid, methyl ester, 1,4-dioxide and 19 g. of 1,3-propylene glycol in 50 ml. of dimethylformamide is heated to 40° C. and treated with 37 mg. (0.5 mmole) of calcium hydroxide. The resulting reaction mixture is allowed to stir at this temperature for 8 hours and is then cooled and diluted with 60 ml. of water. The product is extracted with methylene chloride and the organic phase separated, dried over sodium sulfate and concentrated to dryness in vacuo. The crude product is recrystallized from chloroform-hexane.

EXAMPLE 5

Employing the procedure of Example 4 and starting with the known requisite diols, substituted 3-methyl-2-quinoxalinecarboxylic acid, methyl ester, 1,4-dioxide, and the indicated base, the following congeners are prepared:

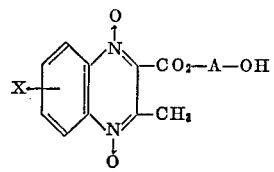

| X (6 or 7) | Base | A | X (6 or 7) | Base | A |
|---|---|---|---|---|---|
| H | 1 | —CH(CH₃)CH₂— | H | 1 | —(CH₂)₂CH(CH₃)— |
| H | 1 | —CH₂CH(CH₃)— | H | 1 | —CH(CH₃)(CH₂)₂— |
| H | 2 | —(CH₂)₄— | H | 2 | —CH(CH₃)CH(CH₃)— |
| Cl | 1 | —(CH₂)₃— | CF₃ | 2 | —(CH₂)₂— |
| Cl | 2 | —CH(CH₃)CH(CH₃)— | CH₃ | 1 | —CH(CH₃)CH(CH₃)— |
| Cl | 2 | —CH₂CH(CH₃)CH₂— | CH₃ | 1 | —CH(CH₃)CH₂CH(CH₃)— |
| Cl | 1 | —(CH₂)₂— | CH₃ | 1 | —CH(CH₃)CH₂— |
| Cl | 1 | —CH₂CH(C₂H₅)CH₂— | CH₃ | 2 | —CH₂CH(CH₃)— |
| Br | 1 | —(CH₂)₃— | CH₃ | 1 | —(CH₂)₄— |
| Br | 2 | —(CH₂)₅— | CH₃O | 2 | —(CH₂)₂— |
| Br | 1 | —CH₂CH(CH₃)CH₂— | CH₃O | 2 | —CH(CH₃)CH(CH₃)— |
| CF₃ | 2 | —CH(CH₃)CH(CH₃)— | CH₃O | 1 | —CH(CH₃)CH₂CH(CH₃)— |
| CF₃ | 2 | —(CH₂)₂— | CH₃O | 1 | —CH₂C(CH₃)₂CH₂— |
| CF₃ | 2 | —CH₂CH(C₂H₅)CH₂— | CH₃O | 2 | —(CH₂)₅— |

Note.—1=Ca(OH)₂; 2=Ba(OH)₂.

EXAMPLE 6

3-methyl-2-quinoxalinecarboxylic acid, 2-acetoxyethyl ester, 1,4-dioxide

To a solution of 7.0 g. (0.03 mole) of 3-methyl-2-quinoxalinecarboxylic acid, methyl ester, 1,4-dioxide and 28 g. of 2-acetoxyethanol in 65 ml. of dimethylsulfoxide heated to 40° C. is added 56 mg. (0.75 mmole) of calcium hydroxide. The resulting solution is allowed to stir at this temperature for 6 hours and is then cooled and diluted with 70 ml. of water. The mixture is extracted with chloroform and the organic phase separated, dried over sodium sulfate and concentrated under reduced pressure. The residual product is recrystallized from ether-hexane.

EXAMPLE 7

Starting with the appropriately substituted 2-quinoxalinecarboxylic acid, (lower)alkyl ester, 1,4-dioxide, requisite alkanol, and the indicated base and employing the procedure of Example 6, the following esters are prepared:

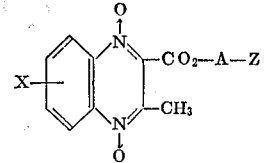

| X (6 or 7) | A | Z | Base |
|---|---|---|---|
| H | —CH$_2$CH$_2$— | HCO$_2$— | 1 |
| H | —CH$_2$CH$_2$— | CH$_3$CH$_2$CO$_2$— | 2 |
| H | —CH$_2$CH$_2$— | (CH$_3$)$_2$CHCO$_2$— | 1 |
| H | —(CH$_2$)$_3$— | CH$_3$CO$_2$— | 1 |
| H | —CH(CH$_3$)CH$_2$— | HCO$_2$— | 2 |
| CH$_3$ | —CH(CH$_3$)CH$_2$— | CH$_3$CH$_2$CO$_2$— | 1 |
| CH$_3$ | —(CH$_2$)$_4$— | CH$_3$CO$_2$— | 2 |
| CH$_3$ | —CH(CH$_2$)$_2$— \| CH$_3$ | (CH$_3$)$_2$CHCO$_2$— | 1 |
| CH$_3$ | —CH(CH$_3$)CH$_2$CH(CH$_3$)— | CH$_3$CO$_2$— | 1 |
| CH$_3$ | —CH(CH$_3$)CH$_2$CH(CH$_3$)— | HCO$_2$— | 2 |
| OCH$_3$ | —CH$_2$CH$_2$— | CH$_3$(CH$_2$)$_2$CO$_2$— | 1 |
| OCH$_3$ | —CH$_2$CH$_2$— | HCO$_2$— | 1 |
| OCH$_3$ | —CH(C$_2$H$_5$)(CH$_2$)$_2$— | HCO$_2$— | 1 |
| OCH$_3$ | —CH$_2$C(CH$_3$)$_2$CH$_2$— | CH$_3$CO$_2$— | 2 |
| OCH$_3$ | —CH$_2$CH(C$_2$H$_5$)CH$_2$— | CH$_3$(CH$_2$)$_2$CO$_2$— | 2 |
| OCH$_3$ | —(CH$_2$)$_5$— | CH$_3$CO$_2$— | 1 |
| CF$_3$ | —CH$_2$CH$_2$— | CH$_3$CO$_2$— | 1 |
| CF$_3$ | —CH(CH$_3$)CH$_2$— | (CH$_3$)$_2$CHCO$_2$— | 1 |
| CF$_3$ | —CH$_2$CH(CH$_3$)(CH$_2$)$_2$— | CH$_3$CO$_2$— | 2 |
| F | —(CH$_2$)$_2$— | —O$_2$CCHBrCH$_3$ | 1 |
| F | —(CH$_2$)$_2$— | —O$_2$C(CH$_2$)$_2$CH$_2$Cl | 2 |
| F | —(CH$_2$)$_2$— | —O$_2$COCH(CH$_3$)$_2$ | 2 |
| F | —CH$_2$C(CH$_3$)$_2$CH$_2$— | —O$_2$CCH$_2$Cl | 2 |
| F | —CH$_2$C(CH$_3$)$_2$CH$_2$— | O$_2$CO(CH$_2$)$_3$CH$_3$ | 2 |
| F | —CH$_2$C(CH$_3$)$_2$CH$_2$— | —O$_2$CCH(CH$_3$)$_2$ | 1 |
| Cl | —CH(C$_2$H$_5$)CH$_2$— | —O$_2$COCH$_3$ | 1 |
| Cl | —CH(C$_2$H$_5$)CH$_2$— | —O$_2$CCH(CH$_3$)CH$_2$Cl | 1 |
| Cl | —CH(C$_2$H$_5$)CH$_2$— | —O$_2$COCH$_2$CH(CH$_3$)$_2$ | 2 |
| Cl | —(CH$_2$)$_2$— | —O$_2$C(CH$_2$)$_6$CH$_3$ | 2 |
| Br | —(CH$_2$)$_4$— | —O$_2$CCH$_2$Br | 1 |
| Br | —(CH$_2$)$_4$— | —O$_2$C(CH$_2$)$_2$CH$_2$Cl | 1 |
| Br | —(CH$_2$)$_4$— | —O$_2$COC$_2$H$_5$ | 1 |
| Br | —CH(C$_2$H$_5$)(CH$_2$)$_2$— | —O$_2$CCH$_2$CH$_2$Cl | 1 |
| Br | —CH(CH$_3$)(CH$_2$)$_3$— | —O$_2$COC$_2$H$_5$ | 1 |
| Br | —CH(CH$_3$)(CH$_2$)$_3$— | —O$_2$COCH(CH$_3$)$_2$ | 2 |
| CH$_3$ | —CH(CH$_3$)CH$_2$— | —O$_2$CCH$_2$Cl | 2 |
| CH$_3$ | —CH(CH$_3$)CH$_2$— | —O$_2$CO(CH$_2$)$_3$CH$_3$ | 1 |
| CH$_3$ | —CH(CH$_3$)CH$_2$— | —O$_2$C(CH$_2$)$_8$CH$_3$ | 1 |
| CH$_3$ | —CH$_2$CH$_2$— | —O$_2$COC$_2$H$_5$ | 2 |
| OCH$_3$ | —(CH$_2$)$_5$— | —O$_2$CCHClCH$_3$ | 1 |
| OCH$_3$ | —(CH$_2$)$_5$— | —O$_2$C(CH$_2$)$_7$CH$_3$ | 1 |
| OCH$_3$ | —(CH$_2$)$_5$— | —O$_2$CCHBrCH$_2$CH$_3$ | 1 |
| OCH$_3$ | —CH$_2$CH(C$_2$H$_5$)CH$_2$— | —O$_2$CO(CH$_2$)$_3$CH$_3$ | 2 |
| OCH$_3$ | —CH$_2$CH(C$_2$H$_5$)CH$_2$— | —O$_2$CCHClCH$_3$ | 1 |
| OCH$_3$ | —CH$_2$CH(C$_2$H$_5$)CH$_2$— | —O$_2$CCH(C$_2$H$_5$)$_2$ | 1 |
| CF$_3$ | —(CH$_2$)$_2$— | —O$_2$COCH$_2$CH(CH$_3$)$_2$ | 2 |
| CF$_3$ | —(CH$_2$)$_2$— | —O$_2$CCHBrCH$_2$CH$_3$ | 2 |
| CF$_3$ | —(CH$_2$)$_2$— | —O$_2$CCHCl(CH$_2$)$_2$CH$_3$ | 2 |
| CF$_3$ | —(CH$_2$)$_4$— | —O$_2$COCH$_3$ | 1 |
| CF$_3$ | —(CH$_2$)$_4$— | —O$_2$CCH(CH$_3$)(CH$_2$)$_6$CH$_3$ | 2 |
| H | —(CH$_2$)$_2$— | —O$_2$CNHCH$_3$ | 1 |
| H | —(CH$_2$)$_3$— | —O$_2$CNHC$_2$H$_5$ | 1 |
| H | —(CH$_2$)$_3$— | —O$_2$CNH-n-C$_4$H$_9$ | 2 |
| F | —CH$_2$C(CH$_3$)$_2$CH$_2$— | —O$_2$CNHCH$_3$ | 1 |
| F | —CH(C$_2$H$_5$)CH— | —O$_2$CNH—n-C$_3$H$_7$ | 2 |
| Cl | —(CH$_2$)$_2$— | —O$_2$CNH—n-C$_4$H$_9$ | 1 |
| Cl | —(CH$_2$)$_2$— | —O$_2$CNHC$_2$H$_5$ | 2 |
| Br | —CH(CH$_3$)(CH$_2$)$_3$— | —O$_2$CNHCH$_3$ | 2 |
| Br | —CH(C$_2$H$_5$)(CH$_2$)$_2$— | —O$_2$CHN-i-C$_3$H$_7$ | 2 |
| CH$_3$ | —CH(CH$_3$)CH$_2$— | —O$_2$CNH—n-C$_4$H$_9$ | 2 |
| CH$_3$ | —CH(CH$_3$)(CH$_2$)$_2$— | —O$_2$CNHCH$_3$ | 1 |
| OCH$_3$ | —CH$_2$C(CH$_3$)$_2$CH$_2$— | —O$_2$CNH—s-C$_4$H$_9$ | 1 |
| OCH$_3$ | —CH$_2$CH(C$_2$H$_5$)CH$_2$— | —O$_2$CNHC$_2$H$_5$ | 2 |
| OCH$_3$ | —(CH$_2$)$_5$— | —O$_2$CNH—i-C$_3$H$_7$ | 1 |
| CF$_3$ | —(CH$_2$)$_5$— | —O$_2$CNHCH$_3$ | 1 |
| CF$_3$ | —CH$_2$CH(CH$_3$)(CH$_2$)$_2$— | —O$_2$CNH—s-C$_4$H$_9$ | 1 |
| H | —(CH$_2$)$_2$— | —O$_2$CCH$_2$N(C$_2$H$_5$)$_2$ | 2 |
| H | —(CH$_2$)$_3$— | —O$_2$CCH$_2$N(CH$_3$)C$_2$H$_5$ | 1 |
| H | —(CH$_2$)$_3$— | —O$_2$CCH$_2$N(CH$_3$)$_2$ | 2 |
| H | —CH(CH$_3$)CH$_2$— | —O$_2$C(CH$_2$)$_2$N(C$_2$H$_5$)$_2$ | 1 |
| F | —(CH$_2$)$_2$— | —O$_2$C(CH$_2$)$_3$N(CH$_3$)$_2$ | 1 |
| F | —(CH$_2$)$_2$— | —O$_2$C(CH$_2$)$_3$N(CH$_3$)C$_2$H$_5$ | 2 |
| F | —CH$_2$C(CH$_3$)$_2$CH$_2$— | —O$_2$CCH$_2$N(CH$_3$)$_2$ | 1 |
| Cl | —CH(C$_2$H$_5$)CH$_2$— | —O$_2$CCH(CH$_3$)CH$_2$N(CH$_2$)$_2$ | 1 |
| Cl | —(CH$_2$)$_3$— | —O$_2$CCH(C$_2$H$_5$)CH$_2$N(CH$_3$)$_2$ | 1 |
| Br | —(CH$_2$)$_3$— | —O$_2$CN(CH$_3$)C$_2$H$_5$ | 1 |
| Br | —(CH$_2$)$_4$— | —O$_2$C(CH$_2$)$_3$N(CH$_3$)$_2$ | 2 |
| Br | —CH(C$_2$H$_5$)(CH$_2$)$_2$— | —O$_2$C(CH$_2$)$_2$N(C$_2$H$_5$)$_2$ | 2 |
| CH$_3$ | —(CH$_2$)$_2$— | —O$_2$CCH(CH$_3$)CH$_2$N(CH$_3$)$_2$ | 1 |
| OCH$_3$ | —(CH$_2$)$_5$— | —O$_2$CCH(CH$_3$)N(CH$_3$)C$_2$H$_5$ | 2 |
| CF$_3$ | —(CH$_2$)$_4$— | —O$_2$C(CH$_2$)$_4$N(CH$_3$)$_2$ | 1 |
| CF$_3$ | —(CH$_2$)$_4$— | —O$_2$C(CH$_2$)$_4$N(C$_2$H$_5$)$_2$ | 1 |

Note.—1=Ca(OH)$_2$; 2=Ba(OH)$_2$.

EXAMPLE 8

Starting with the same reagents and experimental conditions as employed in Example 1(A) with the exception that known amounts of water are added to the reaction mixture, the following yields of 3-methyl-2-quinoxalinecarboxylic acid, 2-hydroxyethyl ester, 1,4-dioxide are obtained:

| Percent $H_2O$ | Temperature, °C. | Time, hr. | Percent yield of product |
|---|---|---|---|
| 0.05 [1] | 40 | 2 | 83 |
| 0.6 | 40 | 2 | 71 |
| 0.9 | 40 | 2 | 57 |
| 1.4 | 40 | 2 | 57 |

[1] Percent water in Example 1.

EXAMPLE 9

Starting with ethylene glycol containing 0.6 and 0.9% water, and repeating the procedure of Example 1(A), the following variation in reaction time provides the following yields of product:

| Percent $H_2O$ | Temperature, °C. | Time, hr. | Percent yield of product |
|---|---|---|---|
| 0.6 | 40 | 2 | 71 |
| 0.6 | 40 | 3 | 78 |
| 0.6 | 40 | 4.5 | 82 |
| 0.6 | 40 | 18 | 82 |
| 0.9 | 40 | 18 | 81 |

EXAMPLE 10

The procedure of Example 1(A) is again repeated with the exception that the air in the reaction vessel is replaced by the indicated atmosphere. The yield of product for the indicated conditions are as follows:

| Condition— | Percent yield of product |
|---|---|
| Air (dried) | 80 |
| Nitrogen atmosphere | 0 |
| Carbon dioxide atmosphere | 0 |
| Argon atmosphere (99+ purity) | 0 |
| Helium atmosphere (99.9 purity) | 0 |
| Nitrogen atmosphere+air stream | 50 |
| Helium atmosphere+oxygen bleed | 80 |

Similarly, when the procedure of Example 1(B) is repeated employing a nitrogen atmosphere, none of the desired product is isolated.

EXAMPLE 11

Acylation of 3-methyl-2-quinoxalinecarboxylic acid, 2-hydroxyethyl ester, 1,4-dioxide (A) 3-methyl-2-quinoxalinecarboxylic acid, 2-(octanoyloxy)ethyl ester, 1,4-dioxide.—To a solution of 26.4 g. (0.1 mole) of 3-methyl-2-quinoxalinecarboxylic acid, 2-hydroxyethyl ester, 1,4-dioxide and 30.3 g. (0.3 mole) of triethyl amine in 200 ml. of methylene chloride and cooled to 0° C., is added dropwise 32.5 g. (0.2 mole) of octanoyl chloride in 50 ml. of the same solvent. After stirring at 0° C. for one hour the reaction mixture is allowed to warm to room temperature and is subsequently washed with a saturated sodium bicarbonate solution and then with 6 N hydrochloric acid. The organic layer is separated, dried over magnesium sulfate and evaporated in vacuo to an amber oil which is induced to crystallize with ether-petroleum ether, 25.7 g., M.P. 62–64° C.

By replacing octanoyl chloride with the appropriate acid chloride, the following compounds are similarly prepared:

3-methyl-2-quinoxalinecarboxylic acid, 2-(propionyloxy) ethyl ester, 1,4-dioxide, M.P. 95° C.;
3-methyl-2-quinoxalinecarboxylic acid, 2 - (butyryloxy) ethyl ester, 1,4-dioxide, M.P. 68–69° C.;
3-methyl-2-quinoxalinecarboxylic acid, 2 - (valeryloxy) ethyl ester, 1,4-dioxide, M.P. 56–60° C.;
3-methyl-2-quinoxalinecarboxylic acid, 2 - (caproyloxy) ethyl ester, 1,4-dioxide, M.P. 70–72° C.;
3-methyl-2-quinoxalinecarboxylic acid, 2-(enanthyloxy) ethyl ester, 1,4-dioxide, M.P. 68–70° C.;
3 - methyl - 2 - quinoxalinecarboxylic acid, 2-(capryloxy) ethyl ester, 1,4-dioxide, M.P. 60–62° C.;
3-methyl-2-quinoxalinecarboxylic acid, 2-(chloroacetoxy) ethyl ester, 1,4-dioxide, M.P. 115–117° C.;
3-methyl-2-quinoxalinecarboxylic acid, 2-[(ethoxycarbonyl)oxy]ethyl ester, 1,4-dioxide;
3-methyl-2-quinoxalinecarboxylic acid, 2-[(isobutoxycarbonyl)oxy]ethyl ester, 1,4-dioxide, M.P. 72–73° C.; and
3-methyl-2-quinoxalinecarboxylic acid, 2 - acetoxyethyl ester, 1,4-dioxide, M.P. 131–133° C.

(B) 3-methyl-2-quinoxalinecarboxylic acid, 2-(4-carboxypropionyloxy)ethyl ester, 1,4-dioxide.—A mixture of 26.4 g. (0.1 mole) of 3-methyl-2-quinoxalinecarboxylic acid, 2-hydroxyethyl ester, 1,4-dioxide, 22 g. (0.22 mole) of succinic anhydride and 100 ml. of triethyl amine in 1 l. of acetone is heated to reflux for 2 hours and then allowed to stir at room temperature for 16 hours. The resulting reaction mixture is poured into water and extracted with chloroform (3× 250 ml.). The aqueous phase is acidified with concentrated hydrochloric acid and the product extracted with chloroform. The organic layer is separated, dried over sodium sulfate and concentrated to an oil under reduced pressure. The residual product is induced to crystallize from methanol, 24.7 g., M.P. 165–167° C.

*Analysis.*—Calcd. for $C_{16}H_{16}O_8N_2$ (percent): C, 52.8; H, 4.4; N, 7.7. Found (percent): C, 52.9; H, 4.6; N, 7.6.

By substitution of glutaric anhydride for succinic anhydride in the above example, 3-methyl-2-quinoxalinecarboxylic acid, 2-(4-carboxybutyryloxy)ethyl ester, 1,4-dioxide, M.P. 114–117° C., is isolated.

*Analysis.*—Calcd. for $C_{17}H_{18}O_8N_2$ (percent): C, 54.0; H, 4.8; N, 7.4. Found (percent): C, 53.7; H, 4.8; N, 7.4.

EXAMPLE 12

Employing the aforementioned two-fold serial dilution technique, the in vitro activity of some of the products of the instant invention against *Staphylococcus aureus* and *Escherichia coli* are presented. Benzylpenicillin (K salt) when tested gave MIC (minimal inhibitory concentration) values of 0.156 and >100 vs. *S. aureus* and *E. coli*, respectively.

| X (6- or 7-) | R | S. aureus | E. coli |
|---|---|---|---|
| H | $-(CH_2)_2-O-\overset{O}{\overset{\|}{C}}CH_3$ | 12.5 | 50 |
| Cl | Same as above | 3.1 | 100 |
| H | $-(CH_2)_2-OH$ | 6.25 | 12.5 |

EXAMPLE 13

The efficacy of 3-methyl-2-quinoxalinecarboxylic acid, 2-(acetoxy)-ethyl ester, 1,4-dioxide, prepared from the corresponding 2-hydroxyethyl ester, a product of the present process invention, in protecting against a systemic challenge infection of *Salmonella choleraesuis* var. *kunzendorf* in swine is demonstrated by the following experiment. Young, 6–8 week old pigs are conditioned for fourteen days in isolation rooms and maintained during the entire study on a basal ration consisting of:

| Ingredient— | Percent |
|---|---|
| Ground yellow corn | 78.4. |
| Soybean meal | 15.0. |
| Alfalfa meal | 2.0. |
| Meat bone scraps | 2.5. |
| Limestone | 0.4. |
| Dicalcium phosphate | 0.65. |
| Iodized salt | 0.5. |
| Vitamin pre-mix PPM #5 [a] | 0.5. |
| Quadruple delamix [b] | 0.05. |
| Zinc carbonate | 7.8 g./100 lbs. mix. |

[a] Contributed the following levels of vitamin per pound of ration: vitamin A, 2951 I.U.; vitamin D₃, 681 I.C.U.; vitamin E, 5 I.U.; menadione, 1 mg.; riboflavin, 4 mg.; niacin, 2.5 mg.; pantothenic acid, 4 mg.; vitamin B₁₂, 7.5 mcg.
[b] Contributed the following levels of trace mineral in parts per million: manganese, 120; iron, 40; copper, 4; iodine, 2.4; cobalt, 0.4; zinc, 0.2.

All the pigs, which are divided into groups of six, are inoculated on day 0 with 4 ml. (approximately $2.0 \times 10^8$ organisms) of the stock inoculating suspension. Treatment with the quinoxaline-di-N-oxides of the present invention is carried out on day 0 and day 1 by intramuscular injection at 12 hour intervals at doses of 2.5 and 5 mg./kg. On day 10 the percent mortality in each group is calculated. The following results are obtained:

| Medication— | Percent mortality |
|---|---|
| Infected, non-medicated (placebo injection) | 83 |
| 2-methyl-2-quinoxalinecarboxylic acid, 2-(acetyloxy)ethyl ester, 1,4-dioxide (X=H; R=CH₂CH₂O₂CCH₃)— | |
| 2.5 mg./kg. x 4 | 67 |
| 5.0 mg./kg. x 4 | 17 |

EXAMPLE 14

Employing the previously described procedure for determining growth promotion in animals, the following quinoxaline-di-N-oxide, prepared from the products of the present process invention, was tested at 50 g./ton of feed in swine for a period of 28 days and provided the following results:

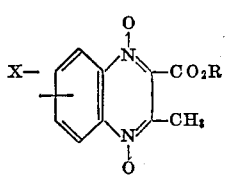

| X | R | Weight gain index [1] | Percent growth over control |
|---|---|---|---|
| H | —(CH₂)₂—O—$\overset{O}{\overset{\|}{C}}$CH₃ | 153 | 53 |

[1] Control=100.

EXAMPLE 15

Using the previously described method for determining in vivo activity, the following compounds were tested orally against *Streptococcus pyogenes* at 200 and 50 mg./kg. and against *Escherichia coli* at 100 and 25 mg./kg., unless otherwise indicated, the results being recorded as the percent animals which survived:

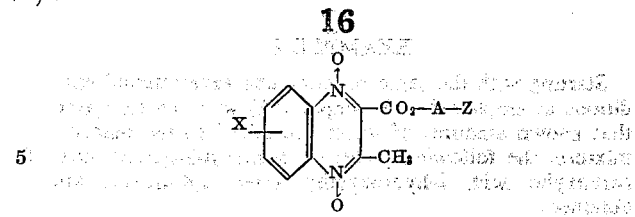

| | | | S. pyogenes | | E. coli | |
|---|---|---|---|---|---|---|
| X | A | Z | 200 | 50 | 100 | 25 |
| H | —(CH₂)₂— | —O—$\overset{O}{\overset{\|}{C}}$CH₃ | 80 | 80 | 100 | 80 |
| Cl | —(CH₂)₂— | —O—$\overset{O}{\overset{\|}{C}}$CH₃ | 100 | 80 | 60 | — |
| H | —(CH₂)₂— | —OH | | | 100 | 60 | 100 | 80 |
| H | —(CH₂)₂— | —O—$\overset{O}{\overset{\|}{C}}$CH₂Cl | | | [1]100 | [2]100 |
| H | —(CH₂)₂— | —O—$\overset{O}{\overset{\|}{C}}$NHC₂H₅ | | | [1]30 | [2]40 |
| H | —(CH₂)₂— | —O—$\overset{O}{\overset{\|}{C}}$—C₉H₁₉ | | | [1]100 | [2]70 |
| H | —(CH₂)₂— | —O—$\overset{O}{\overset{\|}{C}}$OC₂H₅ | | | 30 | — |
| H | —(CH₂)₂— | —O—$\overset{O}{\overset{\|}{C}}$OCH₂CH(CH₃)₂ | | | [1]90 | [2]80 |
| H | —(CH₂)₂— | —O—$\overset{O}{\overset{\|}{C}}$CH₂CH₃ | | | [1]90 | [2]80 |
| H | —(CH₂)₂— | —O—$\overset{O}{\overset{\|}{C}}$(CH₂)₂CH₃ | | | [1]90 | [2]80 |
| H | —(CH₂)₂— | —O—$\overset{O}{\overset{\|}{C}}$(H₂)₃CH₃ | | | [1]100 | [2]60 |
| H | —(CH₂)₂— | —O—$\overset{O}{\overset{\|}{C}}$(CH₂)₄CH₃ | | | [1]90 | [2]0 |
| H | —(CH₂)₂— | —O—$\overset{O}{\overset{\|}{C}}$(CH₂)₅CH₃ | | | [1]100 | 10 |
| H | —(CH₂)₂— | —O—$\overset{O}{\overset{\|}{C}}$(CH₂)₆CH₃ | | | [1]100 | [2]50 |
| H | —(CH₂)₂— | —O—$\overset{O}{\overset{\|}{C}}$(CH₂)₈CH₃ | | | [1]100 | [2]70 |
| H | —(CH₂)₂— | —O—$\overset{O}{\overset{\|}{C}}$(CH₂)₂CO₂H | | | [1]100 | [2]80 |
| H | —(CH₂)₂— | —O—$\overset{O}{\overset{\|}{C}}$(CH₂)₃CO₂H | | | [1]90 | [2]50 |

[1] 200 mg./kg.
[2] 50 mg./kg.

What is claimed is:

1. A process for the preparation of quinoxaline-di-N-oxides of the formula:

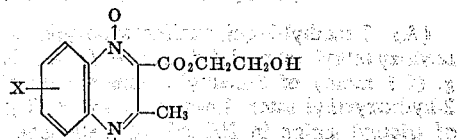

which comprises contacting a compound of the formula:

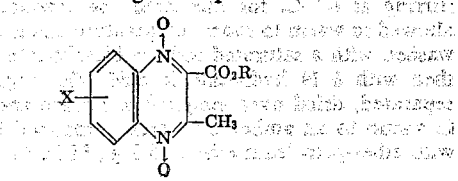

wherein X is a substituent at the 6- or 7-position selected from the group consisting of hydrogen, chlorine, bromine, trifluoromethyl, methyl and methoxy; and R is alkyl containing from 1 to 4 carbon atoms, with ethylene glycol in the presence of oxygen and a catalytic amount of a base selected from the group consisting of calcium hydroxide and barium hydroxide, at a temperature of 30–50° C.

2. The process of claim 1 wherein said catalytic amount of base employed is from about 2.5 to 4.0 mole percent.

3. The process of claim 1 wherein said oxygen is in the form of air.

4. The process of claim 1 wherein said reaction is carried out in a reaction solvent.

5. The process of claim 4 wherein R is methyl, X is hydrogen and the reaction solvent is ethylene glycol.

6. The process of claim 5 wherein the base is calcium hydroxide.

7. The process of claim 5 wherein the base is barium hydroxide.

References Cited
FOREIGN PATENTS
1,215,815   12/1970   Great Britain _____ 260—250 A

OTHER REFERENCES

Morrison, Robert T. et al.: Organic Chemistry, 1961, pp. 489–491, para. 17.20, "Transesterification."

Chemical Abstracts, vol. 69, p. 78502n, 1968, p. 7360, Hajek, K. et al.: Alcoholysis of Vegetable Oils With Glycerol."

Groggins: Unit Processes in Organic Syntheses, New York, McGraw-Hill, 1947, pp. 635–638.

Masterson: Chemical Principles, Saunders, Philadelphia, 1966, p. 439.

ALEX MAZEL, Primary Examiner

R. D. McCLOUD, Assistant Examiner

U.S. Cl. X.R.
252—475, 476; 424—250